United States Patent [19]

Wilde et al.

[11] Patent Number: 4,674,643
[45] Date of Patent: Jun. 23, 1987

[54] PLASTIC CLOSURE WITH STRUCTURAL THREAD FORMATION

[75] Inventors: Sheldon L. Wilde, Crawfordsville; Hugh V. Morton, Jr., Veedersburg, both of Ind.

[73] Assignee: H-C Industries, Inc., Crawfordsville, Ind.

[21] Appl. No.: 841,864

[22] Filed: Mar. 20, 1986

[51] Int. Cl.⁴ .............................................. B65D 41/34
[52] U.S. Cl. ................................... 215/252; 215/307; 215/329
[58] Field of Search .................... 215/252, 329, 307

[56] References Cited

U.S. PATENT DOCUMENTS

| | | | |
|---|---|---|---|
| 3,893,583 | 7/1975 | McLaren | 215/329 X |
| 4,343,754 | 8/1982 | Wilde et al. | 264/154 |
| 4,378,893 | 4/1983 | Wilde et al. | 215/252 X |
| 4,407,422 | 10/1983 | Wilde et al. | 215/329 X |
| 4,476,987 | 10/1984 | Nolan | 215/329 X |
| 4,497,765 | 2/1985 | Wilde et al. | 215/252 X |

Primary Examiner—Donald F. Norton
Attorney, Agent, or Firm—Dressler, Goldsmith, Shore, Sutker & Milnamow, Ltd.

[57] ABSTRACT

A plastic closure for use on a container having an externally threaded neck is disclosed wherein the skirt portion of the closure cap includes an internal structural thread formation. The structural thread formation comprises a helical thread ramp portion which is configured for load-bearing engagement with the thread of the associated container, and further includes means for reinforcing the thread ramp portion, in the form of a plurality of spaced-apart reinforcing gussets. The provision of the structural thread formation desirably facilitates high-speed molding of the closure, and desirably acts to reduce the quantity of plastic material required for molding the closure.

15 Claims, 3 Drawing Figures

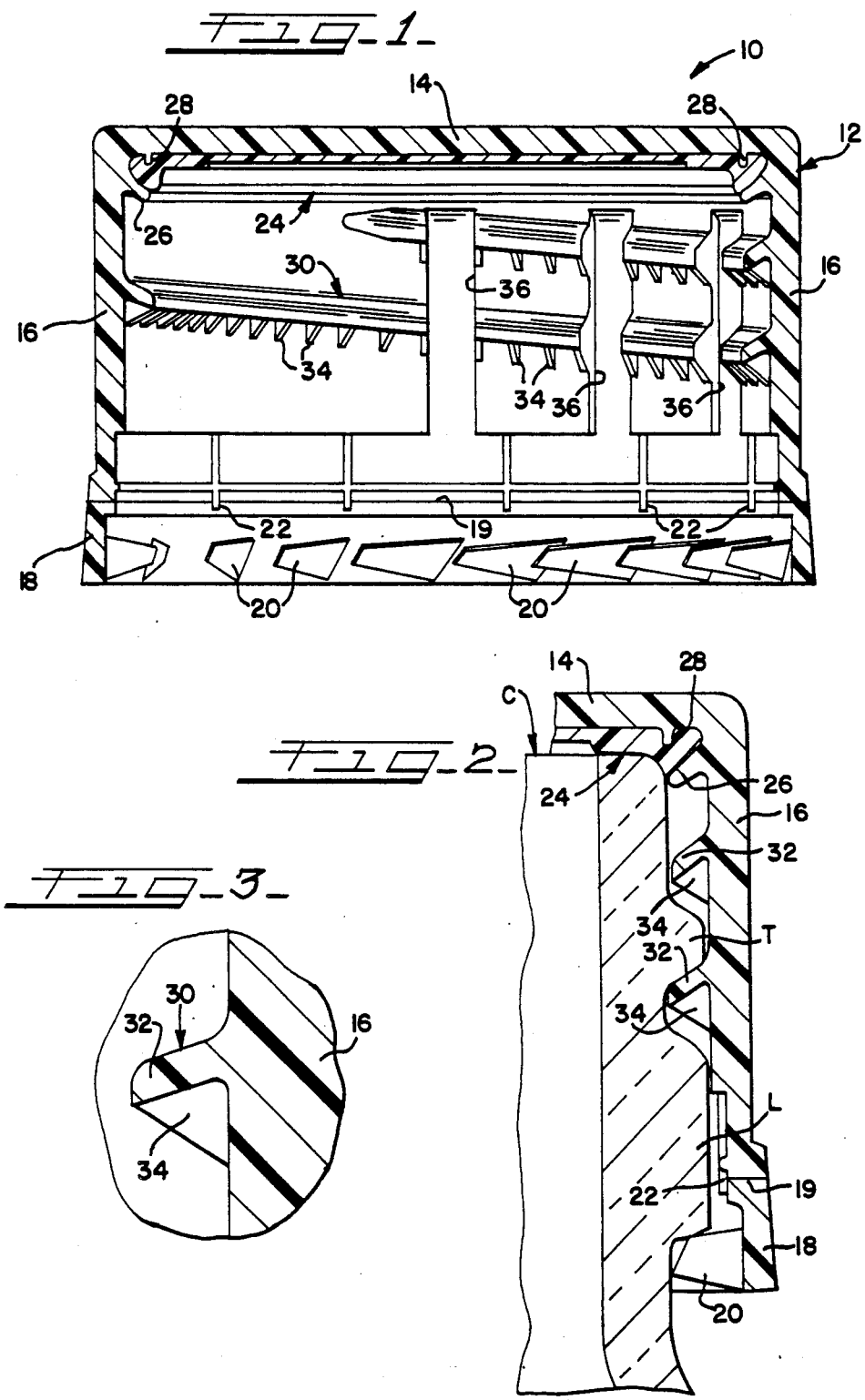

PLASTIC CLOSURE WITH STRUCTURAL THREAD FORMATION

TECHNICAL FIELD

The present invention relates generally to plastic closures such as for use on bottles and like containers, and more particularly to a plastic closure having a structural thread formation comprising a load-bearing thread ramp portion configured as a partial thread profile, and a plurality of spaced-apart reinforcing gussets. The structural thread formation facilitates high-speed closure formation, and desirably acts to reduce the plastic material required for each closure.

BACKGROUND OF THE INVENTION

Commonly-assigned U.S. Pat. Nos. 4,378,893 and 4,407,422 disclose composite plastic closure constructions which have proven to be commercially successful. In particular, the closure constructions disclosed in these patents have proven highly effective for use on containers having carbonated or otherwise pressurized contents, with the closure constructions further lending themselves to very economical, high-speed manufacture. Commonly-assigned U.S Pat. Nos. 4,343,754 and 4,497,765 disclose methods and apparatus for effecting efficient manufacture of the above types of closures.

In accordance with the forming methods disclosed in the above patents, an outer plastic shell or cap of the closure is formed by molding, preferably compression molding, wherein plastic material is molded between a generally cup-shaped female molding cavity, and a male molding plunger which enters the female cavity. In order to permit use of the plastic closures on containers having a thread formation, an annular skirt portion of the plastic cap is formed with internal threads, which such internal threads are formed by external thread-forming grooves defined by the male molding plunger.

In accordance with the teachings of the above patents, high-speed closure manufacture is promoted by "stripping" or "popping-off" a molded plastic cap from the male molding plunger (as opposed to relatively rotating the closure so that it is "unthreaded" from the male plunger). As will be appreciated, this stripping action results in outward deformation of the closure's skirt portion as the molded closure threads are urged out of the thread-forming grooves of the male plunger as the molded cap is removed from the plunger. Relative motion of the male plunger with respect to a stripper sleeve positioned coaxially thereabout effects stripping of the molded cap in this manner after the cap has been removed from the associated female molding cavity.

Economical closure manufacture is in part greatly dependent upon the speed with which cap molding can be achieved. In this regard, the nature of the above-described "stripping" step has been found to act to limit the speeds at which the molding equipment can be operated. More specifically, it has been found that as forming speeds are increased, the stripping of the molded cap from the male molding plunger can result in unacceptable deformation of the just-formed closure threads.

Such thread deformation is believed to be a result of the relatively high stresses exerted on the closure thread during stripping (bearing in mind that sufficient force must be generated to flex the closure skirt portion outwardly for stripping), with the thread comprising one of the thickest cross-sectional portions of the closure. Since the forming "cycle time" for manufacture of closures of the present type is only a matter of seconds, the relatively great mass of plastic material at the closure thread may not be sufficiently cooled and cured so as to provide the threads with the requisite strength for high-speed stripping. Thus, relatively increased forming speeds can result in the closure thread being unacceptably deformed or "wiped-off" as the closure is stripped from the forming plunger.

Since increased forming speeds promote economical closure manufacture, it is highly desirable to provide a threaded plastic closure construction configured to promote high-speed manufacture. Additionally, it is important to bear in mind that any manner by which the amount of plastic material employed in a closure can be reduced, without impairing the closure's strength and sealing characteristics, is very desirable.

SUMMARY OF THE INVENTION

In accordance with the present invention, a plastic closure comprising a plastic closure cap is disclosed, wherein the closure cap includes an internal, structural thread formation. The thread formation is structural in the sense that it comprises a thread ramp portion which defines, in cross-section, a partial, asymmetrical thread profile. The thread formation further comprise reinforcing means adjacent the thread ramp portion, which in the illustrated embodiment comprises a plurality of spaced-apart reinforcing gussets. By this arrangement, the thread ramp portion defines a load-bearing surface for engagement with a thread formation of a container, with the relatively reduced quantity of material required for forming the thread structure desirably facilitating high-speed closure manufacture and economical material usage.

A plastic closure embodying the principles of the present invention includes a plastic closure cap having a top wall portion, and an annular skirt portion depending from the top wall portion. In the illustrated embodiment, the present closure is shown as including a plastic sealing liner positioned within the plastic cap adjacent the top wall portion, and as further including a tamper-indicating pilfer band depending from the annular skirt portion.

The plastic closure cap includes a thread formation formed integrally on the interior of the annular skirt portion, with the thread formation configured to threadably mate with the external threads provided on the neck of a bottle or like container. In accordance with the present invention, it has been recognized that the thread formation of a plastic closure need only include but a single load-bearing surface (either continuous or discontinuous) generally facing the top wall portion of the closure cap. The structural thread formation of the present closure thus includes a helical thread ramp portion which defines the requisite load-bearing surface, wherein the thread ramp portion is configured to define, in cross-section, a partial, asymmetrical thread profile. Thus, rather than providing the typical, generally symmetrically profiled helical thread, the closure of the present invention includes a thread formation which provides a partial, asymmetrical thread profile. The load-bearing surface defined by the thread ramp portion is configured to engage that helical surface (either continuous or discontinuous) of the container thread which generally faces away from the mouth of the container.

While a structural thread formation embodying the principles of the present invention may be configured in various forms, it is presently preferred that the thread formation include means for reinforcing the thread ramp portion of the structure. To this end, the thread formation preferably includes a plurality of spaced-apart, generally radially extending reinforcing gussets which extend integrally between the thread ramp portion and the skirt portion of the closure, generally opposite of the thread ramp portion's load-bearing surface.

While a closure in accordance with the present invention can readily be formed with a continuous thread formation (i.e., one which extends without interruption about the interior of the closure skirt portion), the thread formation in the illustrated embodiment of the present invention is shown as being discontinuous; thus, the thread ramp portion of the formation and load-bearing surface defined thereby are discontinuous. In the preferred form, discontinuities in the thread formation are provided whereat one or more axially extending gas venting grooves are defined by the closure cap. Such gas venting grooves, which are preferably defined by the skirt portion of the closure cap, extend generally across the thread formation at discontinuities defined thereby.

Other advantages and features of the present invention will become readily apparent from the following detailed description, the accompanying drawings, and the appended claims

BRIEF DESCRIPTION OF THE DRAWINGS

FIG. 1 is an enlarged, cross-sectional view of a plastic closure having a structural thread formation embodying the principles of the present invention;

FIG. 2 is a partial cross-sectional view of the present closure shown after application thereof to an associated, threaded container; and FIG. 3 is a relatively enlarged, fragmentary cross-sectional view of the structural thread formation of the present closure.

DETAILED DESCRIPTION

While the present invention is susceptible of embodiment in various forms, there is shown in the drawings and will hereinafter be described a presently preferred embodiment, with the understanding that the present disclosure is to be considered as an exemplification of the invention, and is not intended to limit the invention to the specific embodiment illustrated.

Referring first to FIG. 1, therein is illustrated a plastic closure 10 embodying the principles of the present invention. Closure 10 includes an outer plastic closure cap or shell 12 which includes a disk-shaped top wall portion 14, and an annular skirt portion or sidewall 16 depending from top wall portion 14.

In the illustrated embodiment, closure 10 is shown as including an integral, tamper-indicating pilfer band 18 which depends from skirt portion 16, and which is generally distinguished therefrom by a circumferentially extending score line 19. Pilfer band 18 includes a plurality of circumferentially spaced, container-engaging flexible projections 20, with the pilfer band at 18 least partially detachably connected to the the skirt portion 16 by a plurality of spaced-apart frangible bridges 22. The illustrated pilfer band 18 can be formed in accordance with the teachings of commonly-assigned U.S. Pat. No. 4,418,828.

In the illustrated embodiment, plastic closure 10 is shown as a so-called composite closure, including the outer plastic closure cap 12, and an inner sealing liner 24 positioned within cap 12 adjacent to top wall portion 14. Sealing liner 24 is adapted to sealingly engage an associated container. In the preferred form, closure 12 includes an annular, liner-retaining lip 26 against which liner 24 is formed, and which acts to retain liner 24 in position within the cap. Closure cap 12 may further include a plurality of liner-engaging projections 28 extending integrally from top wall portion 14 in engagement with sealing liner 24.

Referring now to FIGS. 1 and 2, closure 10 is configured for application to an associated container, designated C. A typical configuration of the neck portion of a container C is shown, wherein the neck portion defines an external, helical container thread T. On a typical container for bottling carbonated beverages and the like, the container neck is further provided with an annular locking ring L positioned beneath container thread T. The locking ring L is ordinarily provided on a container for cooperation with a tamper-indicating portion of an associated closure. In this regard, flexible projections 20 of pilfer band 18 are configured to engage and coact with locking ring L attendant to closure removal, whereby the pilfer band 18 is at least partially detached from skirt portion 16.

In previous plastic closure constructions, a thread formation has typically been provided on the interior surface of the closure skirt or sidewall for mating engagement with the container thread T. Such closure threads have generally been symmetrically configured, in cross-section profile, with the closure thread thus defining upper and lower surfaces which generally converge at the crest of the thread.

While plastic closures having a thread configured with a symmetrical profile can readily be formed to exhibit the necessary container-engaging strength, it was recognized during development of the present invention that formation of a symmetrically profiled thread can inhibit high-speed closure manufacture. It was further recognized that after application to an associated container, only one side or surface of a symmetrically profiled closure thread is load-bearing, i.e., that surface of the thread which generally faces the top wall portion of the closure. The opposite surface of the thread is ordinarily not load-bearing.

It was thus realized that an improved closure article could be formed by providing the interior of the skirt portion of a closure with a thread formation 30 in accordance with the present invention, wherein the thread formation is not formed with the usual symmetrical profile, but instead is arranged generally assymetrically to include essentially only one helical load-bearing surface. Accordingly, the illustrated thread formation 30 includes a thread ramp portion 32 which is of a generally lip-like configuration, and which defines, in cross-section, a partial, asymmetrical thread profile. Thread ramp 32 defines a load-bearing surface along its extent which generally faces the top wall portion 14 of the closure cap 12, and further defines a recess generally opposite the load-bearing surface.

Bearing in mind that the structural thread formation of the present invention has been configured to require a relatively reduced quantity of material as compared to a conventional, symmetrical thread, thread ramp 32 must nevertheless exhibit sufficient rigidity for the closure to exhibit the necessary container-engaging strength. While a closure accordance with the present invention may be formed with a structural thread formation configured to include only thread ramp 32, it is presently preferred that reinforcing means be provided in operative association with the thread ramp for reinforcement and rigidification thereof.

To this end, thread formation 30 preferably comprises a plurality of circumferentially spaced-apart, reinforcing gussets 34 which are positioned adjacent to thread ramp 32 generally opposite of its load-bearing surface. Gussets 34 extend integrally between the thread ramp portion 32 and the closure skirt portion 16 generally within the recess defined by the thread ramp portion. While the spacing, dimensions, and shLpe of reinforcing gussets 34 may be varied in keeping with the principles disclosed herein, a current embodiment of the present closure employs reinforcing gussets each having a thickness on the order of 0.020 inches, with the gussets spaced at approximately six degree intervals about the axis of the closure.

While a closure having a structural thread formation in accordance with the present invention may be formed that the thread formation is continuous (i.e. extends without interruption throughout its extend), the thread formation 30 in the illustrated embodiment is discontinuous, with the thread ramp 32, and the load-bearing surface defined thereby, being likewise discontinuous. More specifically, formation 30 is discontinuous at each point whereat the thread formation is traversed by one or more axially extending, gas venting grooves 36 preferably defined by the closure. In the preferred form, each gas venting groove 36 is defined by the closure skirt portion 16 (i.e., each gas venting groove is formed into the skirt portion beyond the root portion of thread formation 30), with a discontinuity in thread formation 30 being provided where each one of the venting grooves 36 extends generally across thread formation.

As will be recognized by those familiar with the art, the provision of gas venting grooves 36 promotes the venting of gas pressure from an associated container (such as one having carbonated contents) as the closure 10 is removed from the container, and sealing liner 24 is unseated from the container. Venting grooves 36 permit gas pressure to escape and be vented prior to disengagement of thread formation 30 from container thread T.

From the foregong, it will be observed that numerous modifications and variations can be effected without departing from the true spirit and scope of the novel concept of the present invention. It is to be understood that no limitation with respect to the specific embodiment disclosed herein is intended or should be inferred. It is, of course, intended to cover by the appended claims all such modifications as fall within of the claims.

What is claimed is:

1. A plastic closure comprising:
   a plastic closure cap including a top wall portion and an annular skirt portion depending from said top wall portion;
   said cap including a thread formation on the interior of said skirt portion, said thread formation comprising helical thread ramp means defining a load-bearing surface generally facing said top wall portion, and a non-load-bearing surface opposite said load-bearing surface relative to the crest of said thread ramp means,
   said thread formation including means for reinforcing said thread ramp means, said reinforcing means being positioned adjacent to said non-load-bearing surface of said thread ramp means and adjacent to the interior of said skirt portion generally opposite the load-bearing surface of asid thread ramp means.

2. A plastic closure in accordance with claim 1, wherein
   said thread ramp means is discontinuous, whereby said load-bearing surface defined thereby is discontinuous.

3. A plastic closure in accordance with claim 1, wherein claim 1, wherein
   said closure cap defines at least one axially extending gas venting groove means at the skirt portion thereof.

4. A plastic closure in accordance with claim 1, wherein
   said reinforcing means comprises a plurality of spaced-apart reinforcing gussets.

5. A plastic closure in accordance with claim 1, wherein
   said load-bearing surface and said non-load-bearing surface of said thread ramp means are asymmetrically configured, in cross-section profile, relative to a horizontal line through said crest of said thread ramp means.

6. A plastic closure in accordance with claim 10, wherein
   said non-load-bearing surface defines a recess with the interior of said skirt portion.

7. A plastic closure comprising:
   a plastic closure cap including a top wall portion, and an annular skirt portion depending from said top wall portion,
   said cap including integral thread formation on the interior of said skirt portion, said thread formation comprising helical thread means, defining a load-bearing generally facing said top wall portion,
   said thread formation further comprising reinforcing means positioned adjacent said thread ramp means generally opposite the load-bear surface defined thereby, said reinforcing means a plurality of spaced-apart reinforcing gussets extending integrally between said skirt portion and said thread ramp means.

8. A plastic closure in accordance with claim 6, wherein
   said thread formation is discontinuous, whereby said thread ramp and said load-bearing surface defined thereby are discontinuous,
   said plastic cap including at least one axially extending gas venting groove means defined by said skirt portion, said venting groove means extending generally across said thread formation at a discontinuity defined thereby.

9. A plastic closure accordance with claim 8, including
   a plastic sealing liner positioned adjacent said top wall portion of said plastic cap.

10. A plastic closure in accordance with claim 7, wherein
    said plastic cap includes a tamepr-indicating pilfer band integral with and depending from said skirt portion.

11. A plastic closure in accordance with claim 7, wherein said thread ramp means further defines a non-load-bearing surface opposite said load-bearing surface relative to the crest of thread ramp means and adjacent said spaced-apart reinforcing gussets, said non-load-bearing surface and the interior skirt portion defining a recess therebetween.

12. A plastic closure in accordance with claim 7, wherein said thread ramp further defines a non-load-bearing surface opposite said load-bearing surface relative to the crest of said thread ramp means and adjacent said spaced-apart reinforcing gussets, said reinforcing gussets extending inwardly of the interior of said skirt portion substantially entirely accross said non-load-bearing surface.

13. A plastic closure comprising:

a plastic closure cap including a top wall portion and an annular skirt portion depending from said top wall portion, said cap including an integral thread formation comprising helical ramp means, said thread ramp means defining a load-bearing surface generally facing said top wall portion, and a non-load-bearing surface opposite said load-bearing surface relative to the crest of said thread ramp means, said non-load-bearing surface and the interior of said skirt portion defining a recess therebetween.

14. A plastic closure in accordance with claim 13, wherein said thread formation further comprises reinforcing means at least partially disposed in said recess for reinforcing said thread ramp means.

15. A plastic closure in accordance with claim 14, wherein said reinforcing means comprises a plurality of spaced-apart reinforcing gussets extending integrally between said skirt portion and ramp means.

* * * * *

UNITED STATES PATENT AND TRADEMARK OFFICE
CERTIFICATE OF CORRECTION

PATENT NO. : 4,674,643

DATED : June 23, 1987

INVENTOR(S) : Sheldon L. Wilde, et al.

It is certified that error appears in the above-identified patent and that said Letters Patent is hereby corrected as shown below:

```
Column 2, line 28, the word "comprise" should be "comprises";
Column 3, line 14, the word "tioncan" should be "tion can";
          line 32, the word "theappended" should be
                  "the appended";
Column 4, line 10, the word "andwhich" should be "and which";
Column 5, line 16, the word "shLpe" should be "shape";
          line 25, after the word "formed", insert --such--;
          line 26, the word "extend" should be "extent";
          line 39, after the word "across", insert --the--;
          line 42, after the word "the", insert --preferred--;

Column 6, line 51, after the word "ramp", insert --means--;
          line 61, after the word "portion", insert --inside--;
          line 64, the word "tamepr" should be "tamper";
Column 6, line  6, the word "asid" should be "said";
          line 37, after the word "including", insert--an--;
          line 39, after the word "thread", insert --ramp--;
          line 40, after the word "bearing", insert --surface--;
          line 44, after the word "means", insert --comprising--;
Column 7, line  3, after the word "of", insert --said--;
          line  5, after the word "interior", insert --of--;
          line 14  the word "accross" should be "across";
Column 8, line  2, after the word "helical", insert --thread--;
```

UNITED STATES PATENT AND TRADEMARK OFFICE
CERTIFICATE OF CORRECTION

PATENT NO. : 4,674,643

DATED : June 23, 1987

INVENTOR(S) : Sheldon L. Wilde, et al.

It is certified that error appears in the above-identified patent and that said Letters Patent is hereby corrected as shown below:

Column 8, line 18, after the word "and", insert the words --said thread--.

Signed and Sealed this

Third Day of November, 1987

Attest:

DONALD J. QUIGG

*Attesting Officer*  *Commissioner of Patents and Trademarks*